Oct. 8, 1940.      A. BOYNTON      2,217,043
WELL TESTING TOOL
Filed Oct. 4, 1938      3 Sheets-Sheet 2
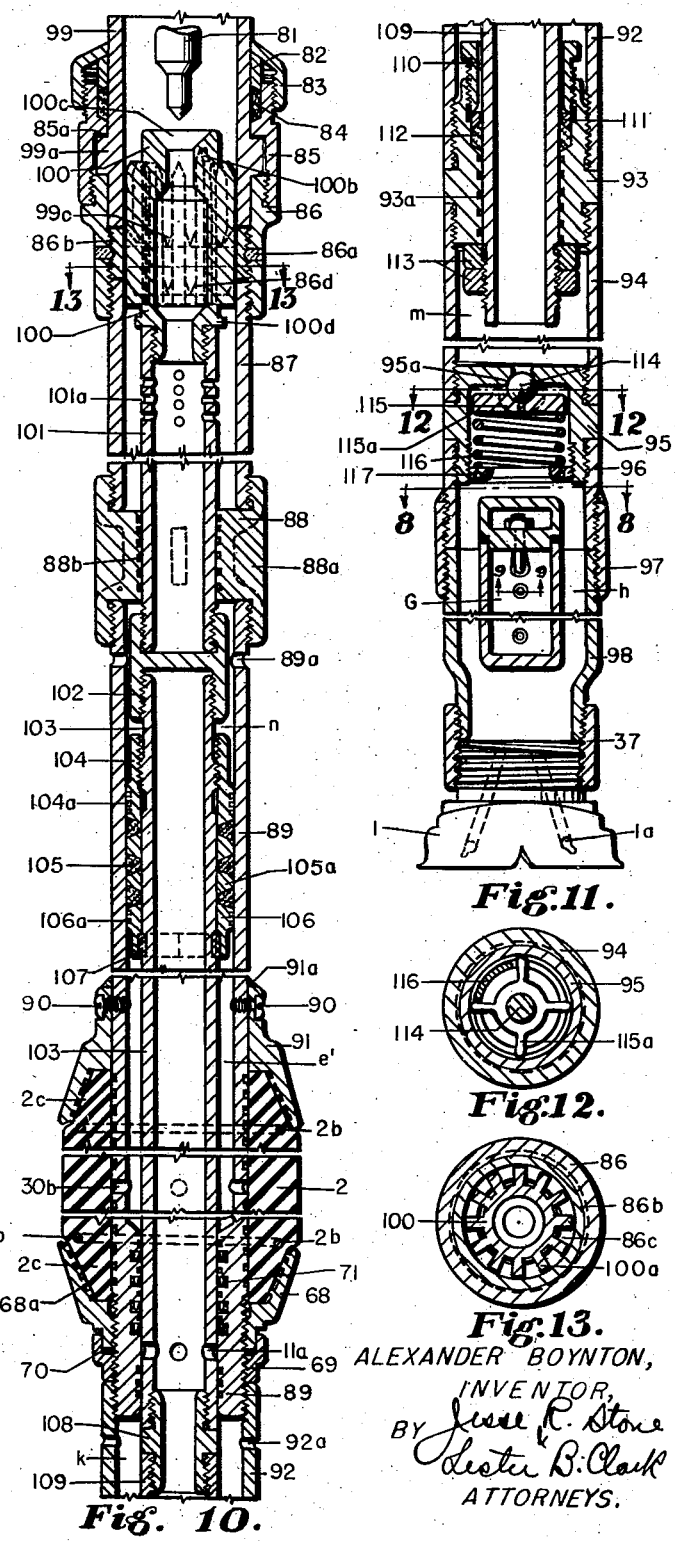
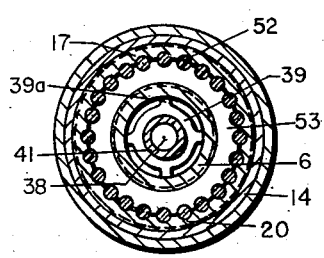
Fig. 4.
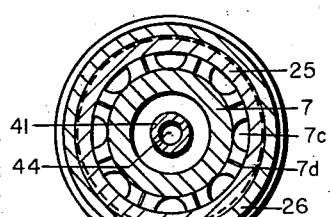
Fig. 5.
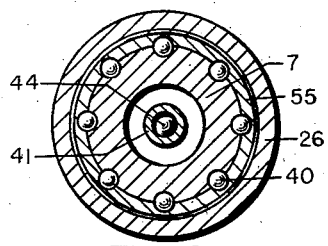
Fig. 6.
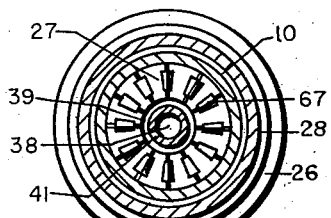
Fig. 7.
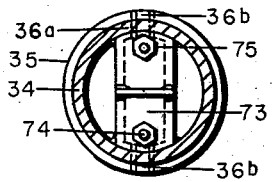
Fig. 8.
Fig. 9.
ALEXANDER BOYNTON,
INVENTOR,
BY Jesse R. Stone
Lester B. Clark
ATTORNEYS.

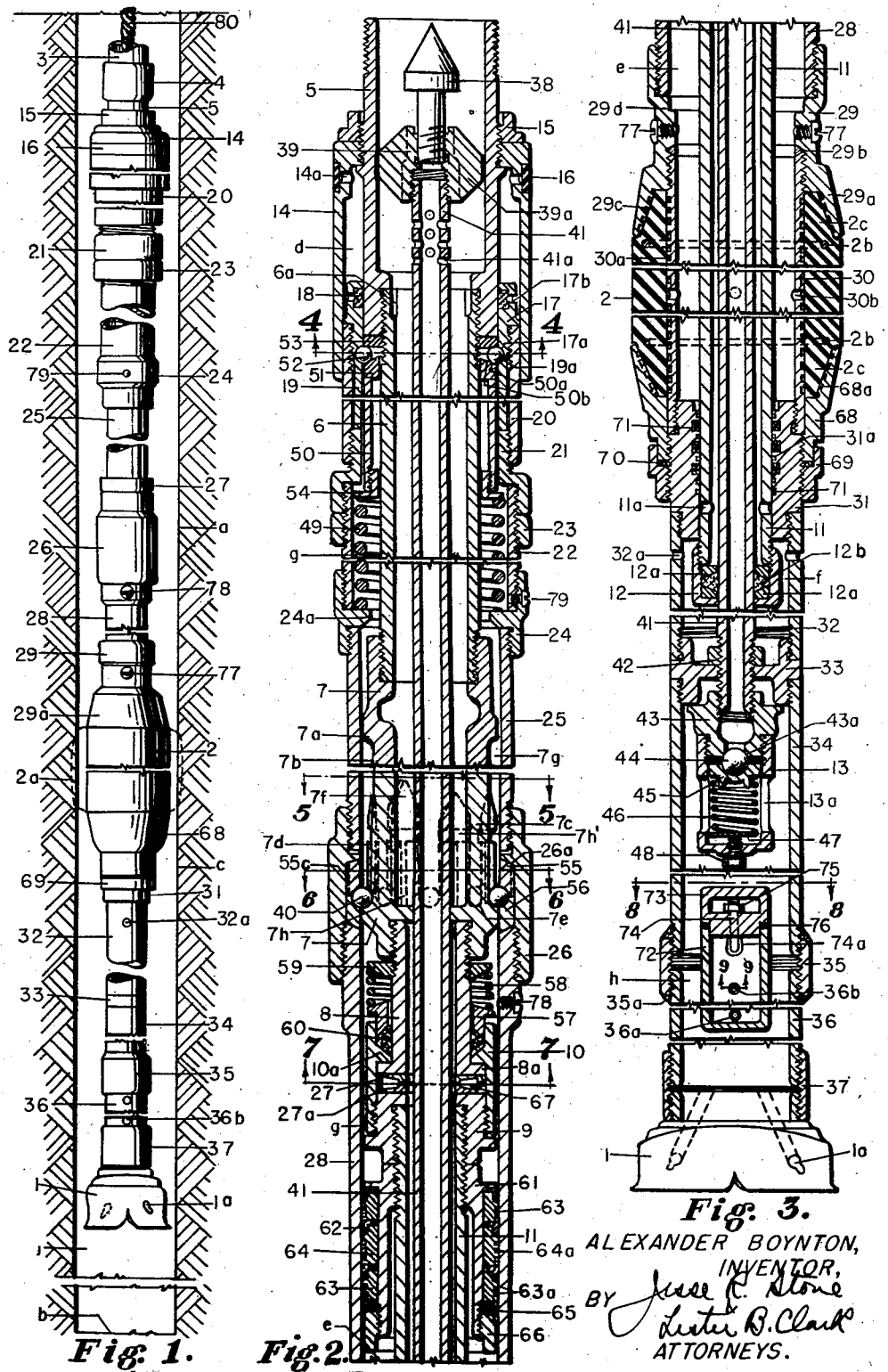

Oct. 8, 1940.  A. BOYNTON  2,217,043
WELL TESTING TOOL
Filed Oct. 4, 1938  3 Sheets-Sheet 3
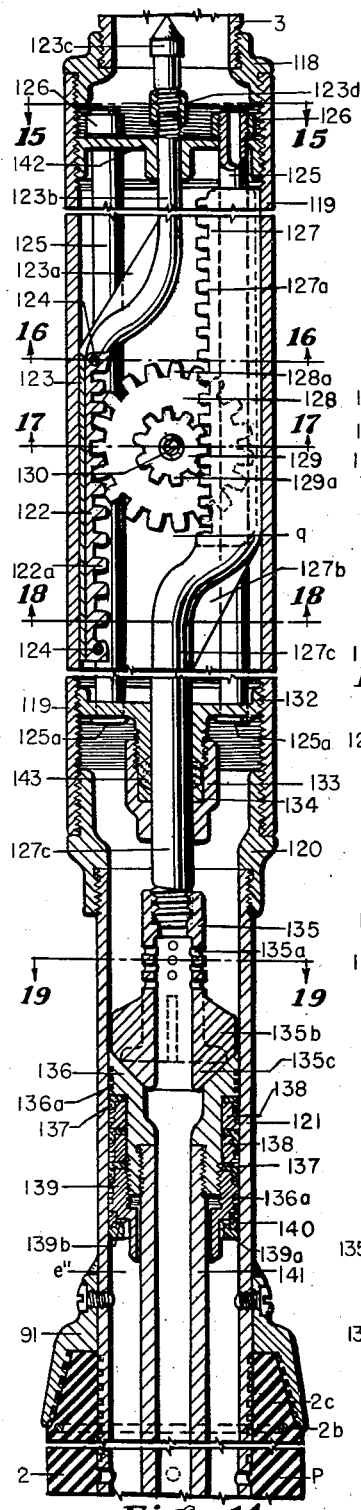
Fig. 14.
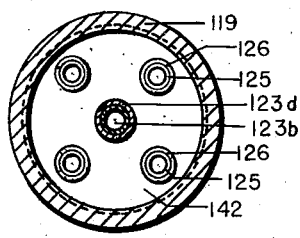
Fig. 15.
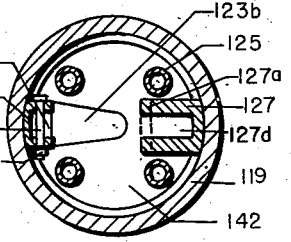
Fig. 16.
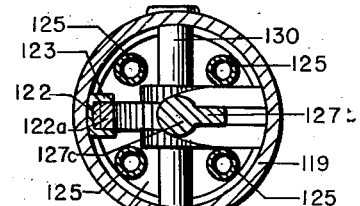
Fig. 17.
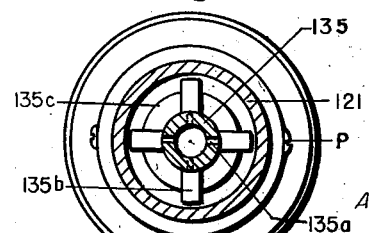
Fig. 18.
Fig. 19.
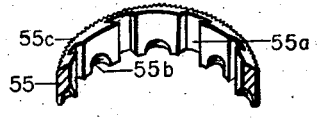
Fig. 20.
Fig. 21.
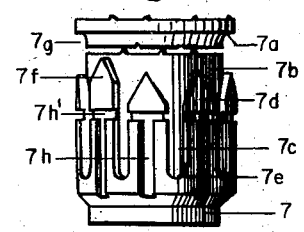
Fig. 22.
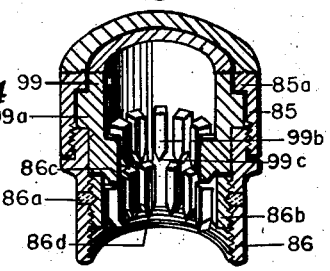
Fig. 23.
Fig. 24.
ALEXANDER BOYNTON,
INVENTOR
BY
ATTORNEYS.

Patented Oct. 8, 1940

2,217,043

UNITED STATES PATENT OFFICE 2,217,043

WELL TESTING TOOL

Alexander Boynton, San Antonio, Tex.

Application October 4, 1938, Serial No. 233,237

19 Claims. (Cl. 166—1)

My invention relates to well testing tool or device in which a packer carried by the drill stem or other pipe is lowered to the top of, or slightly above the formation to be tested. The drill pipe is suspended and supports the packer construction at any desired level. Mechanism is provided to keep the well fluid from entering the drill stem until the packer has been expanded against the adjacent formation, so as to prevent downward movement of well fluid from above the packer during the test. The packer is so expanded by fluid pressure from a piston, the piston being actuated by a cable. The movement of the piston which expands the packer by fluid pressure also opens the drill stem below the packer for entrance of well fluid. This operation, in effect, pumps the well dry down to the level of the packer. Whatever fluid the well produces into the testing tool while the packer is set, is a fair test of what the formation below the packer will produce if casing be set and the well completed. Releasing the cable pull automatically releases the packer and closes the liquid intake into the testing tool below the packer, after which the drill stem may be bailed, swabbed, or withdrawn from the well in order to ascertain the result of the test.

No shoulder, or so-called rat hole, is required as an abutment to set this packer. It may be set anywhere in the well bore. Neither is it necessary that the drill stem extend to bottom of the well in expanding the packer. The position of the packer in the well is determined by the length of drill stem above the packer, and not by the length of anchor string below the packer, the latter string being now generally employed to determine the position of all straight hole packers.

The packer herein employed will not stick or "freeze" in the well bore, as packers now used so frequently do; because when the cable pull which causes the packer expansion is released, the pressure of well liquid automatically compresses the packer.

A latch is employed to normally hold the device in its fully extended position to be lowered into the well bore. The latch telegraphs to the operator, so to speak, by producing an audible shock and noticeable vibration along the drill stem or pipe when it springs. The latch may be sprung either by a cable pull, as will be explained, or by the drill stem or device encountering heavy mud, cavings, or other obstruction which might endanger withdrawal of the tool unless the drill stem be rotated or pumped through as it is lowered.

The drill stem may be pumped through at any time, as well as rotated, while the device is being run into or being withdrawn from the well.

Some type of bit, usually a fish tail, is ordinarily, but not necessarily, attached to the lower end of the device to facilitate mixing the mud if necessary to do so by rotating the drill stem or pumping through it, either or both, while lowering the device into the well.

No turning of the drill pipe is required to cause expansion of the packer, or opening or closing of the intake ports; such operation being wholly controlled by means of an attachable and detachable cable, operated through the drill stem from the surface.

A clutch is provided proximately above the packer. This clutch is normally engaged, so that the entire drill stem and device may be rotated as a unit. The clutch is adapted to become disengaged by the same cable pull which springs the latch and expands the packer. After the packer has been expanded, the drill stem from the clutch upward may be rotated as in drilling, while the packer and all parts upon which it is mounted remain stationary during the test.

A flare or tell tale fluid is discharged immediately above the packer as the packer expands to sealing-off engagement with the well bore. This flare fluid is of a different color from that of the well liquid. The flare fluid remains trapped in the well bore above the packer unless the packer should fail to effect a complete seal-off. If the packer, due to some enlargement or other imperfection in the well bore, should fail to effect a complete seal-off, flare fluid will be found with the test fluid in the drill stem.

The device also provides for the employment of means for recording pressures, temperatures, etc., obtaining in the well.

The main objects of this invention are to provide a formation testing device for drilled wells, which device has the following advantages:

First: That it may be safely run into, and readily withdrawn from a well for the purpose of recovering a measured sample of the well's production from the horizon below where the packer is set, whether the well be cased or uncased; and which device may be also used to discover, locate, and measure leaks through the casing.

Second: That it operates in a straight bore, and does not require that an offset or shoulder be provided by drilling a rat hole of reduced diameter into or through the formation to be tested.

Third: That the pipe upon which the device is run may be rotated from top to bottom, including the device itself, while it is being lowered into, or being withdrawn from the well, and which may be pumped through during any or all such time.

Fourth: That the pipe may be rotated above the device when a production test is being made, while the device and anchor string remain stationary.

Fifth: That affords means for advising the operator when mud or cavings that should be rotated through or pumped out have been encountered, as the device is being lowered into operating position.

Sixth: That, by the action of a piston having suitable effective area, the packer may be set with more force than other packers which employ the weight of drill pipe to expand them.

Seventh: That, by wholly withdrawing the internal pressure employed to expand the packer, the packer is released and contracted by external pressure of the well fluid, which pressure also causes the intake ports to close and urges all other parts toward their normal position.

Eighth: That the device may be placed anywhere in a well bore by merely raising or lowering the drill stem upon which it is run; and that by swabbing or bailing the test fluid out of the drill stem after each test, additional tests may be made in rapid succession by merely raising or lowering the drill pipe, so as to place the packer in proper position for each test.

Ninth: That will show whether any of the fluid recovered in the test came from a formation other than that being tested.

Tenth: That pressure and temperature recording instruments, and other instruments if desired, may be placed in the device for the purpose of ascertaining the pressure and temperature and variations thereof, obtaining during the test in the formation tested.

Eleventh: That, due to the test, or series of tests, which may be rapidly conducted at moderate cost with this device, all information about a well's production is quickly available, thereby rendering it unnecessary to take cores of the formation in drilling for oil, gas, water, or other mineral.

With the foregoing and other related objects in view, reference is now made to the drawings, in which Fig. 1 is a side elevation of the preferred form of the invention shown in a well bore, with portions of the device broken out, the expanded position of the packer being illustrated by dotted lines.

Fig. 2 is a longitudinal section of the upper portion of the device indicated in Fig. 1.

Fig. 3 is a longitudinal section of the lower portion, completing the device partially shown in Fig. 2.

Fig. 4 is a transverse section on the line 4—4, Fig. 2.

Fig. 5 is a transverse section on the line 5—5, Fig. 2.

Fig. 6 is a transverse section on the line 6—6, Fig. 2.

Fig. 7 is a transverse section on the line 7—7, Fig. 2.

Fig. 8 is a transverse section on the line 8—8, Figs. 3—11.

Fig. 9 is a transverse section on the line 9—9, Figs. 3—11.

Fig. 10 is a longitudinal section of the upper portion of the first modified form of the invention.

Fig. 11 is a longitudinal section of the remaining portion of the device not shown in Fig. 10.

Fig. 12 is a transverse section on the line 12—12, Fig. 11.

Fig. 13 is a transverse section on the line 13—13, Fig. 10.

Fig. 14 is a longitudinal section through the second modified form on the line 14—14, Fig. 17.

Fig. 15 is a transverse section on the line 15—15, Fig. 14.

Fig. 16 is a transverse section on the line 16—16, Fig. 14.

Fig. 17 is a transverse section on the line 17—17, Fig. 14.

Fig. 18 is a transverse section on the line 18—18, Fig. 14.

Fig. 19 is a transverse section of the line 19—19, Fig. 14.

Fig. 20 is a perspective view of the upper base shown in Fig. 2.

Fig. 21 is a perspective view of the lower base shown in Fig. 2.

Fig. 22 is a perspective outside view of the shell shown in Fig. 2.

Fig. 23 is a longitudinal section in perspective of the female members of the clutch shown in Fig. 10.

Fig. 24 is a perspective view of a portion of the male clutch members of the clutch shown in Fig. 10.

The same reference characters are employed to refer to the same or duplicate parts throughout the several views.

The sections 8'—8', and 9'—9', Fig. 11, while the same in form as the sections 8—8, and 9—9, respectively, Fig 3, are differentiated therefrom to avoid confusion in the reference numerals which are different for some of the parts cut by these sections.

In Fig. 1, the preferred form of the invention is shown inserted in a well bore $a$, with the fish tail bit 1 hanging in the well, the packer 2 being positioned proximately above the formation to be tested $c$.

The dotted lines 2a indicate the packer expanded into sealing off engagement with the well formation after the latch has been sprung, by means of a cable 80 attached to pull bar 38, means being provided to attach and detach the cable from the pull bar when necessary to expand or contract the packer, as required. The means for attaching and detaching the cable from the pull bar is not shown because many tools for such purpose are old and well known in the art. That part of the well bore between the bit and bottom of the well $b$, indicated at $j$, shows that the device may be positioned anywhere in a well bore and that no anchor string is required to support the packer from bottom of the well.

The outer shell of the device having limited telescopic movement over the next inner string, is constructed of cap 17, nipple 20, coupling nipple 21, nipple 22, coupling member 24, nipple 25, coupling nipple 26, nipple 28, packer shield coupling 29, packer nipple 30, having weld 29b, whereby this nipple may be secured to member 29 for convenience in assembling and taking the device apart; sleeve nipple 31, nipple 32, cable anchor member 33, nipple 34, coupling 35 welded to nipple 36 at 35a; nipple 36, coupling 37, and bit 1.

The inner string, adapted to have limited telescopic movement within the outer shell, has its uppermost position upon the shell determined by the engagement of balls 40, Fig. 2, within the pockets 7e at the lower end of slots 7c in the clutch shell 7, Figs. 2 and 22. The lowermost position of the inner string is limited by the engagement between balls 40 and shoulder 7a of clutch shell 7. This inner string is formed of nipple 5, which may be threadedly joined to coupling 4 and drill stem 3, Fig. 1, above it, and also threadedly joined to nipple 6, having special wrench slots 6a, below it.

Continuing downward, the other members of the inner string are clutch shell 7, nipple 8, bearing support 9, bearing housing nipple 10, and intake valve nipple 11, having intake ports 11a. In each form of the invention, the drill stem will be considered as extending to and including the nipple, having intake ports 11a.

The packer 2, which may be of rubber or any other strong, durable, and expansible substance, loosely fitted over the nipple 30, has its tapered ends 2c closely received within the circular metallic cups or shields 29a and 68, respectively. The grooves 30a, 29c, and 68a provide that the packer will have secure engagement with the surfaces in which these grooves are formed when the packer is urged against them with great force. The reinforcing rings 2b, preferably of steel, may be moulded into the packer proximate the inner ends of retaining cups 29a and 68. The member 68, threaded upon sleeve 31, has packing 70 between its lower end and locking ring 69, for the purpose of preventing fluid under high pressure, within the annular chamber e, from escaping through the slight clearance between shield member 68 and nipple 30 and along the threads between member 68—31. The threaded engagement between members 68 and 31 provides means for causing the tapered ends of the packer to be tightly engaged within their respective cups or sleeves, as is apparent. The tapered ends 2c of the packer may each be six to eight inches long. The distance between the steel rings 2b may be ten to eighteen inches. The thickness of the packer walls between the rings should be at least as much as the clearance between the packer and the well bore, and should be considerably thicker if diameters will permit. The clearance between the packer and the wall of the well bore may be, ordinarily, three-eighths to three-fourths inch all around the packer.

The piston base 61, threadedly engaged upon nipple 11, has cups 62 mounted upon it, the cups being spaced apart by end cup spacers 63, having peripheral grooves 63a; and central cup spacers 64, having peripheral grooves 64a. The cups and spacers are secured in their assembled position, as shown, by piston assembly clamp 66 engaged upon washer 65. This assembly, which has a close sliding fit within nipple 28, will be referred to as piston 61—66. It will be understood that the annular chamber e should be filled with a liquid, preferably of a viscous nature, such as paint, glycerine, or heavy oil. When the piston is forced downward, in a manner to be explained, the fluid in chamber e is forced out through openings 30b, this fluid expanding the yieldable packer into strong leakproof engagement with the wall of the well bore, as indicated at 2a, Fig. 1. The chamber e may be filled or drained through the openings shown closed by plugs 77, as is apparent in Fig. 3. Manifestly, the effective area of piston 61—66 should be such that the packer will be expanded far enough to securely engage the adjacent formation before the clamp ring 66 will land upon the shoulder 29d, this shoulder being provided to arrest the downward movement of the piston before the cups 62 can reach the openings 30b, in passing which openings they would, of course, be damaged. It is also apparent that the same force exerted to drive the piston downward will cause greater pressure in chamber e, and at the same time cause ample expansion of the packer, if the effective area of the piston be made less and its travel increased. The cross sectional area of the annular space between the nipples 11 and 28 is the effective area of the piston 61—66, as appears in Fig. 2.

It will be noted that pull tube 41, having perforations 41a, has its bottom end threadedly engaged within the central opening through the cable anchor 33, the engagement between these members being secured by a lock nut 42, and further secured by clamp nut 43 engaging upon the lower end of member 33. The winged coupling 39 has threaded connection between pull tube 41 and pull bar 38. Wings 39a, slidable within nipple 5, hold the member 38 centrally aligned within nipple 5 for convenience in attaching thereto and detaching therefrom the overshot or other means used on a cable to manipulate the piston and packer. It will be noted that pull tube 41, through its connection with cable anchor 33, is adapted to hold or raise the outer shell of the device, upon which the packer is mounted, by means of a cable which may be removably attached to pull bar 38. It is, therefore, apparent that the outer shell of the device may be stopped or anchored, independent of the inner string of the device, at any place in the well bore, by merely attaching a cable to pull bar 38, and making the cable fast above the drill stem. Means for attaching a cable to the upper end of bar 38, after it has been lowered into the well, and of detaching the cable therefrom, at will of the operator, are not shown in this application because, as stated, such means are old and well known to the art.

If a cable be attached to pull bar 38, and the upper end of the cable be made fast, it is evident that lowering the drill stem will force piston 61—66 downward and expand the packer in the same manner as the packer would be expanded if the bit were landed on bottom of the well. When the drill stem is so lowered, nipple 11 has telescopic movement over pull tube 41, Figs. 2 and 3. Packing 12b, washers 12a and gland clamp 12 provide a leakproof engagement between these members, as shown in Fig. 3.

While expanding the packer, it is evident that the fluid in chamber e must be prevented from escaping therefrom, except through openings 30b communicating with the interior of the packer. This chamber is caused to so confine the liquid, by means of ring shaped U cups 71, Fig. 3, and packing, or other substance, placed or allowed to accumulate in grooves 31a within the central opening through sleeve nipple 31, it being understood that the lower end of nipple 11 has a close sliding fit within this opening and through the cups and/or packing which engage between the members 11 and 31, as shown in Fig. 3. It is also apparent that the tapered ends 2c, respectively, of the packer will be urged with great force against the inner surfaces of cups or shields 29a and 68, where the grooves 29c and 68a will cause the packer fabric to imbed therein when the packer is expanded by great force of liquid pumped through the openings 30b by the piston 61—66.

Proximate the upper end of the device the piston nipple 5 has a close sliding fit within latch chamber cap 17 and a free sliding fit within sleeve 19 and nipple 20. A packing 18, contained within an annular recess in the central opening through latch chamber cap 17, engages with the piston member 5. Well fluid pressure contacts this packing via pressure ports 17b, chamber d, discharge ports 14a, and rubber band 16, in order to make leak proof the engagement between members 5 and 17 during the telescopic movements between these members in the operation of the device.

The latch balls 52, Fig. 2, are received to slightly less than one half their diameter within the circular groove 17a—19a within which groove they are normally held by the expansive force of spring 49, having its lower end supported by internal flange 24a. Spring cap 54, ball floor support 50, and ball floor ring 51, which may be of hardened steel, transmit the force of this spring to the balls, which are normally impinged between ball rider ring 53, threadedly engaged over the nipple 6, and ring 51.

This ring has its upper end formed by two surfaces, each at a different angle. The outer angle surface 50a engages with the balls while they are imbedded within the recess 17a—19a, as shown in Fig. 2. The inner angle surface 50b engages the balls when they are forced out of said recess by downward thrust of the drill stem, this thrust being imparted to the balls by ring 53, which may be of hardened steel. The sleeve 19, which may be of case hardened steel, has an easy removable fit within the nipple 20 and is normally held in the position shown by the threaded engagement between nipple 20 and 21.

Manifestly, the greatest latching force will be exerted by the latch when balls 51 are engaged within the circular recess 17a—19a to the maximum depth of this recess. This latching force may be diminished by screwing the nipple 21 upward upon the nipple 22, thus forcing the latch balls inward and partially out of the recess 17a—19a. When the desired adjustment has been obtained, locking ring 23 may be employed to secure the adjustment. In this connection, it may be observed that clutch balls 40, normally engaging within pockets 7e at lower ends of slots 7c, will prevent any upward movement of ball rider ring 53 when nipple 21 is screwed upward. It is, therefore, apparent that the latch may be adjusted, as stated. Care should be exercised that recess 17a—19a has slightly less depth than one half the diameter of the balls, for the reason that the latch balls would become locked against downward movement, and thereby render the latch inoperative, if the depth of this recess were equal to, or greater than, one half the diameter of the balls.

When the latch springs, the balls roll inward and ride downward within the nipples 19 and 21. In this travel, the inner angle surface 50b urges the balls outward with enough force to safely cause them to roll outward and again engage within the recess 17a—19a when the latch returns. In the meantime, this force is not great enough to cause the balls to damage the inner surfaces of nipples 19 and 21.

The chamber g may be filled with a lubricant to provide lubrication for the latch and clutch. This lubricant may be supplied through the openings shown closed by plugs 78 and 79, Fig. 2.

The spring 49, in addition to furnishing the necessary force for the latch, also serves to yieldably maintain the device in its normal or most elongated position.

The clutch, in Fig. 2, is shown in its normal engaged position. This clutch is formed of shell 7, balls 40, upper ball socket base 55, and lower ball socket base 56. The upper base, having slots 55a, Fig. 20, for circulation of a lubricant within the annular chamber g, may be pressed into nipple 26 and landed upon the internal shoulder 26a, the flutes 55c being imbedded within the inner wall of this nipple. The lower ball socket base 56, having circulation slots 56a similar to, and aligning with, the slots 55a, is fitted loosely within the nipple 26 for convenience in taking the clutch apart. The base 56 is held in place by the threaded engagement between members 26 and 28, as appears. The clutch balls 40 are received for one half of their diameter within the sockets 55b—56b, Figs. 20 and 21, and extend for the other half of their diameter into the slots 7c formed by the ribs 7f and 7d. These slots, like the sockets, have a common depth equal to approximately one half the diameter of the balls. The slots are open at their upper ends and closed at their lower ends where they are formed into pockets 7e conforming to the balls.

The portion of reduced external diameter 7b forms the annular chamber 7g, also having a uniform depth equal to one half the diameter of the balls.

The upper portion of shell 7 immediately above the circular shoulder 7a has slight clearance, such as $\frac{1}{32}''$ to $\frac{1}{16}''$, within the nipple 25, this clearance being for the circulation of a lubricant, which preferably should be placed within the chamber g for the latch and clutch, and also to provide lubrication for piston 61—66 in its return travel at conclusion of the test. The slots 7h and 7h', Fig. 22, are also for circulation of this lubricant. The balls 40, while free to rotate in their respective sockets, cannot leave these sockets, because, as stated, the slots 7c and annular chamber 7g have a common depth of one half the diameter of the balls. The lower base 56, otherwise free, is locked to upper base 55 by the balls imbedded equally within the mating sockets 55b and 56b, Figs. 20 and 21; and since flutes 55c are securely imbedded within the coupling nipple 26, it is apparent the inner and outer shells of the device are locked together against independent rotation as long as the balls remain within their respective slots 7c.

The downward movement of the inner string which actuates the piston 61—66 to cause expansion of the packer, places the annular space 7g opposite the balls 40. This movement unlocks the clutch. The drill stem may be then freely rotated upon rollers 67, leaving stationary the outer shell, packer, and all other parts below the thrust bearing. The clutch is always so disengaged while the device is intaking test fluid, because the tool is designed so that the piston travel necessary to expand the packer into engagement with the well formation is always greater than the length of the slotted portion of clutch shell 7.

At conclusion of the test, there is no danger that the ribs may impinge upon the balls, due to some possible error in spacing the upper wedge shaped ends of the ribs, because one rib 7f, is longer than the others and, therefore, acts as a pilot to guide the other ribs between the balls.

The flange 8a engaging under the flange 10a causes the nipple 8 to hold the bearing 67 upon bearing support 9 by means of the latter's threaded engagement with bearing housing nipple 10. Packing 60, gland 57, and spring 58 adjustably held by ring 59, threadedly engaged over nipple 8, provide that the bearing consisting of top 27, base 27a, and rollers 67 will not permit leakage into or out of the drill stem.

Obviously, the drill stem should be empty at beginning of each test made with either form of this invention. The check valve assembly consists of check valve clamp nut 43, Fig. 3, having valve seat 43a; valve cage 13, having slots 13a; ball check valve 44, ball support 45, spring 46, spring shoe washer 47, and spring adjusting stud 48. Valve 44, yieldably held against its seat 43a by spring 46, prevents well fluid from entering the drill stem, but allows that pump fluid may be discharged through the drill stem via slots 13a, nipple 34 opening h by the gadget box or instrument case nipple 36, and out through passages 1a of the bit. Pump fluid immediately before reaching the check valve takes a path through passages 41a and tube 41. Ball support 45 has a close movable fit within cage 13 and slots 13a have their upper ends somewhat below the upper end of ball support 45. This distance may be one inch, for example. The ball check valve, therefore, will be one inch from its seat before any pump fluid can escape through slots 13a. Consequently, the valve and seat will not be greatly damaged by abrasive substances usually present in the pump fluid. The compression force of spring 46 may be adjusted by stud 48, as is apparent.

The intake nipple 11 has intake ports 11a, Fig. 3, normally closely sheathed within the lower end of the central opening through sleeve nipple 31. When the drill stem forces the piston 61—66 downward, the nipple 11, upon which this piston is engaged, travels downward far enough to unsheath the intake ports 11a. Well fluid from below the packer may then enter the drill stem via inlet opening 32a, space f, and ports 11a. The same drill stem movement which raises the piston 61—66 and releases the packer at conclusion of the test, also re-sheathes the ports 11a, as is apparent.

The flare chamber d, Fig. 2, which may be filled with a flare or tell tale fluid distinguished in color from the well fluid, is formed within the sleeve 14, which has a close sliding fit over nipple 20. Locking ring 15, having threaded engagement over the piston nipple 5, serves to secure the similar engagement between members 5 and 14. On the downward stroke of the drill stem, the flare fluid is discharged through opening 14a and past rubber band 16. The packer 2 being expanded at the same time that this flare fluid is discharged into the well bore above the packer, it is obvious that flare fluid will be found in the drill stem if the packer should fail to effect a complete seal-off with the well formation. The test is thus made truthful about where the test fluid comes from. On the upstroke of the drill stem, rubber band 16 will yield or rupture to allow well fluid to be drawn into the chamber d. This well fluid, of course, may be drained through openings 14a, and chamber d refilled with flare fluid through the same openings when the drill stem is withdrawn.

The instrument case 72 may be welded into a nipple 36 and coupling 35 by welds 36a, having central openings 36b through them, these openings communicating between the interior of the instrument case and the well bore. The lid 73, by which the instruments may be placed into or removed from the case, is engaged upon packing 76 by studs 74, secured upon case 72 by welds 74a, and nuts 75, in order that all outside communication with the interior of the instrument case will be through openings 36b. Within this case suitable instruments may be placed for the purpose of recording pressures and temperatures and changes therein while the device is being lowered into the well, while the test is on, and while the device is being withdrawn from the well. Such instruments being provided, many of which are available, the operator sees that his watch and the timing mechanism of the instruments agree. A record of the time is kept when running the device in, when it is intaking, and when being withdrawn. The operator then checks his instrument charts with his time record. This check should reveal the place in the well where all recording instrument data was made.

In operation, the device is secured upon the drill stem 3 by means of coupling 4, and lowered into the well bore until the packer is positioned at a point opposite, or slightly above, the formation to be tested, this formation being indicated at c, Fig. 1.

Obviously, all formations below the packer will be on test. If, however, it is desired to separately test any particular formation, to the exclusion of all other formations, it will be necessary to conduct two tests. The first test should be made by setting the packer immediately above the formation to be tested. In the second test, the packer should be set immediately below this formation.

The difference between the two tests will disclose the quantity and character of fluid entering the well bore through the formation between the horizons where the packer was set for both tests. To illustrate, the well is four thousand feet deep, and there is a sand from three thousand to three thousand and twenty feet, it being assumed that there are also numerous other sands in the formation which may be discharging into the well bore below three thousand feet. In order to test the sand between three thousand and three thousand and twenty feet, the packer should be set at, or slightly above three thousand feet for the first test; and again set at three thousand twenty feet, or slightly below, for the second test. If the first test should reveal that all formations below three thousand feet were producing at the rate of one thousand barrels per day, and if the second test should show that all formations below three thousand twenty feet were producing at the rate of five hundred barrels per day, it becomes evident that the sand between three thousand and three thousand twenty feet is producing the other five hundred barrels per day.

The device being lowered into proper position, as above stated, a cable having some form of overshot to engage pull bar 38 is lowered into the drill stem until such engagement is made. The cable is then tightened to securely anchor the outer shell of the device and made fast at the top of the well until the test has been completed. Here it should be recalled that pull tube 41 is attached to the outer shell by means of cable anchor 33, as appears in Fig. 3. The drill stem is now lowered, at which time the latch springs, the clutch disengages, piston 61—66 forces the fluid in chamber e out through openings 30b to expand the packer and, at the same time, uncovers intake ports 11a.

The test is then on, well fluid from below the packer at this time entering the drill stem through inlet ports 32a, annular space f and intake ports 11a, as heretofore explained. The duration of such tests may be for any desired period of time, fifteen to forty-five minutes being usual.

At the conclusion of the test, the cable is given slack. Pressure of well fluid instantly compresses the packer to again engage upon nipple 30 and force piston 61—66 upward while, at the same time, the expansive force of spring 49 aids in forcing the outer shell of the device downward, whereupon intake ports 11a are instantly closed and the latch and clutch become again engaged. Cable 80 is then released from pull rod 38, whereupon the well fluid which entered the drill stem during the test may be recovered, either by withdrawing the drill stem or by bailing or swabbing the test fluid out of it. If the test fluid be bailed or swabbed out, only a few minutes will be required for this operation; whereupon the device may be raised or lowered and other tests made in rapid succession, as heretofore stated, and as is apparent. It will be noted, however, that the drill stem must be withdrawn in order to refill flare chamber d, but the well fluid drawn in through rubber band 16 and ports 14a will be impregnated with enough flare fluid to cause the flare feature to be effective during three or four tests after each filling of this chamber.

If the operator is careful to record the time during which repeated tests are made, the recording instruments may be relied upon to disclose accurate information throughout the several successive tests.

In the first modified form of the invention, illustrated in Figs. 10 and 11, I set out a device similar to that shown in the preferred form, except that the piston which is employed to expand the packer is forced downward by a weight lowered into the drill stem by means of a cable. At conclusion of the test, raising the weight causes the pressure of well fluid to contact the packer and restore all parts to the position shown in Figs. 10 and 11.

No flare means is shown provided for this modification and no latch is deemed necessary.

While being lowered into or withdrawn from the well, the entire device may be rotated with the drill stem, and may be pumped through at any time. The drill stem may be rotated independently of the device, which remains stationary during the test, as in the preceding form.

The outer shell of the device consists of a cap 83, stuffing box base 85, lower clutch shell housing nipple 86, nipple 87, coupling sleeve 88, having ribs 88a and internal grooves 88b; packer nipple 89, packer upper end shield 91, secured upon nipple 89 by weld 91a; nipple 92, sleeve connection 93, nipple 94, check valve cage 95, nipple 96, coupling 97, gadget box housing nipple 98, coupling 37, and bit 1.

The inner string of the device consists of clutch male member 100, nipple 101, coupling 102, intake nipple 103, connection member 108 and nipple 109. The uppermost position of the inner string with reference to the outer shell will be determined by the engagement between nuts 113 and the lower end of connection 93. The lowermost position of the inner string with reference to the shell will be determined by the engagement of circular flange 100d upon the upper end of sleeve 88.

The packer 2, Fig. 10, loosely engaged over nipple 89, has its ends engaged between the shield members 91 and 68. Fluid in the chamber e' is forced to expand this packer through ports 30b, in the same manner as was described for the preferred form of the invention, to which reference is made for all information concerning the packer and its installation. Obviously, the chamber e' may be filled or drained through the openings shown closed by plugs 90, as was stated for the preferred form.

The packer is expanded by downward movement of the piston members, mounted upon nipple 103. The split ring 107, engaging for one half of its depth within an annular recess upon nipple 103, has engaged over it the lower end of base member 106, having grooves 106a, as appears in Fig. 10. Packing 105 and spacers 105a are secured in the position shown by piston clamp 104, having grooves 104a. This piston will be referred to as piston 104—107. A weight 81 is lowered by means of a cable 80 shown in Fig. 1, to force this piston downward and expand the packer. Ring shaped U cups 71, surrounding the central opening through the lower internally upset end of nipple 89, closely engage the nipple 103, which has a close sliding fit through this opening.

A simple form of clutch is shown proximate the upper end of Fig. 10. The drill stem connection member 99 has an external flange 99a, rotatably engaged between the shoulder 85a and the upper end of member 86. A series of equally spaced keys 99b, Fig. 23, having lower wedge shaped ends 99c, are formed interior of the lower end of member 99. The member 86b has an equal number of equally spaced similar keys 86c, with similar wedge shaped lower ends 86d. The members 86 and 86b may be threadedly joined together for manufacturing convenience, in which position they are shown secured by welds 86a.

The male member 100 of this clutch also has an equal number of similar equally spaced keys 100a, having similar wedge shaped upper ends, which keys having an easy sliding fit between the female keys 86c and 99b, will normally lock the members 85 and 86 together, as shown in Fig. 10. When the weight 81 is let down upon the upper end of clutch male member 100 where it engages upon its seat 100c, the keys 100a will be forced below and out of engagement with the keys 99b and 86c. This movement disengages the clutch. The drill stem may then be rotated independently of the packer and outer shell of the device. Packing 84, compressed by gland 82, forced downward by cap 83, maintains the clutch leakproof against entrance of well fluid.

When the weight is lifted, the pressure of well fluid external of the packer will force the packer inward, causing the fluid in chamber e' to force the piston 104—107 upward and re-engage the clutch. It will be noted that one key 100b, Fig. 24, is longer than the others, which are of equal length. This long key acts as a pilot to guide the male member of the clutch into locking engagement, first with the lower keys 86c, and then with the upper keys 99b. These two sets of keys are shown out of alignment, for illustration, in Fig. 23, but by the action of the pilot key 100b, both sets of female keys will be aligned and the clutch again engaged or locked when the piston returns to its upper position after weight 81 has been lifted from the clutch male member 100.

Check valve cage 95, Fig. 11, has a central opening around the lower end of which valve seat 95a is formed to receive check valve 114. The check valve support 115 has arms 115a engaging upon coiled spring 116 installed under enough compression to securely seat the valve.

This spring rests upon, and may have its compression adjusted by spring base ring 117. When necessary to pump through the drill stem, as may be done in the same manner as was stated for the preferred form, this valve will yield to allow the pump fluid to be discharged through the openings 1a of the bit, as is apparent. At all other times, this valve, of course, will remain closed by the force of spring 116, plus the pressure of well liquid exterior of the device, which liquid will exert pressure under the valve via openings 1a of the bit.

It is apparent that intake ports 11a, Fig. 10, will pass out of the lower end of nipple 89 when the piston 104—107 is forced downward to cause expansion of the packer, as explained for the preferred form. Well fluid from below the packer then enters nipple 103 through these ports via annular space k and inlet ports 92a, and passes thence into the drill stem through openings 101a, at which time weight 81 is engaged upon seat 100c and thus closes the opening through clutch member 100. When the intake ports 11a are sheathed as shown in Fig. 10, the close slidable fit which nipple 103 has within the central opening through the lower end of nipple 89, and the action of check valve 114 exclude all well fluid from entering the drill stem, which, of course, should be empty at beginning of the production test.

The instrument case, indicated generally at G, within nipple 98, Fig. 11, is similar in construction and identical in purpose with the instrument case shown and discussed in connection with the preferred form of the invention, and is shown again only to avoid breaking the drawing.

Ports 89a, Fig. 10, allow well fluid to enter the annular space n and press downward upon piston 104—107. The close movable fit which nipple 101 has within the central opening through member 88, and similar fit which the piston has within nipple 89, serve to prevent the escape of this fluid into the drill stem or into the annular space e'.

The chamber m, Fig. 11, is empty when the drill stem is lowered into the well. Packing 112, compressed by gland 111, forced downward by clamp 110 and grooves 93a, which may be filled with packing, serve to exclude well fluid entering the annular space k through ports 92a from the chamber m. Well pressure will be equal above the piston and outside of the packer. Weight 81, which may be a string of steel rods or bars, will exert the necessary force to expand the packer. To illustrate this, it will be assumed that weight 81 weighs two thousand pounds, and that the effective area of piston 104—107 is four square inches; consequently, this weight will cause the packer to expand by a pressure of five hundred pounds per square inch exerted upon the entire inner surface of the packer. If the packer has a central diameter of six inches, by a length of thirty inches, weight 81, therefore, will exert a total force of 282,600 pounds to expand the packer.

Subject to the employment of a different clutch and a different packer expansion means above described, it will be understood that the operation of this first modified form of the invention is so similar to that of the preferred form as to require no further explanation.

In the second modified form of the invention, illustrated in Fig. 14, the piston which causes the packer to be expanded is driven downward by pulling on a cable removably attached to head 123c. The upward force exerted by the cable is reversed and increased by means of two racks disposed on opposite sides of a double pinion.

From, and including, the packer downward, this device may be the same as the first modified form. For that reason the lower part of this construction is not shown in connection with Fig. 14, but reference is made to Figs. 10 and 11 for parts not shown in Fig. 14.

The outer shell, in Fig. 14, consists of bushing 118, nipple 119, connection member 120, and packer nipple 121.

The inner string, upper section, which has limited movement independent of the outer shell, is formed of rack shell 123, single rack 122, double rack 127, and driving shoe 135. The maximum travel of this section is limited by the length of the racks.

The inner string, lower section, is formed of intake nipple 141 and the packer piston parts shown mounted upon it. The travel of this section is controlled by the upper section, as is apparent. The packer, Fig. 14, indicated generally at P, is the same in construction and operation as the packer shown for the first modified form, to which reference is made. The double pinion 128—129 may be cast or otherwise made in one piece. These pinions are mounted within gear case nipple 119 by axle pin 130 secured as shown by cap screw 131, Fig. 17. The single rack 122, having teeth 122a, adapted to engage between the mating teeth 128a of the larger pinion 128, is secured within rack shell 123 by bolts 124 and nuts 124a. The rack shell 123, in addition to housing and carrying the rack 122, has neck 123b, reenforced by rib 123a, against being deformed when the head 123c, attached by coupling 123d, is pulled upon by the cable, as will be explained. The double rack 127, having teeth 127a adapted to engage between the mating teeth 129a of the smaller pinion 129, has rib 127b to reinforce its thrust shaft end 127c to the lower end of which driving shoe 135 has threaded engagement.

The opening 127d, Fig. 16, freely receives the pinion 128, as clearly appears in Figs. 14 and 17. The landing shoe 135c is guided centrally upon piston member 136 by wings 135b, having an easy sliding fit within nipple 121. The diameter of pinion 128 is such as will so space the two racks apart that these racks will each have a free sliding clearance within the nipple 119. Top plate 142, threadedly engaged within the case nipple 119, and base plate 132, also having threaded engagement within nipple 119, serve to house the racks and pinions. The chamber q thus formed may be filled with oil or other lubricant. The neck 123b has a close sliding fit within the central opening through plate 142 and shaft 127c has a similar fit within the similar opening through plate 132. A stuffing box is formed upon the central annular extension of plate 132 in order to more securely confine the lubricant within chamber q. Packing 143 engaged by gland 134, may be compressed by cap 133, as appears in Fig. 14. The tubes 125, Figs. 14, 15, 16, 17, and 18, so spaced as to offer no interference with the action of the racks and pinions, are secured upon and within the plates 132 and 142 by the rolled out or expanded ends 125a engaging under plate 132 and by nuts 126 engaging upon plate 142.

While the device is intaking test fluid from the well formation, in a manner explained for both preceding forms, the well fluid passes through the central opening in shoe 135, out of openings 135a, and up into the drill stem through tubes 125. If it should be necessary to pump through the drill stem to clear the well bore of mud or other obstruction, this may be done, as explained for both preceding forms. Pump fluid, in passing through the device, will take the same path as the one indicated for the test fluid except, of course, in reverse direction.

The piston member 136, threadedly joined upon the upper end of nipple 141, has mounted upon it cups 137, cup spacers 138, piston assembly clamp 139, and packing 140, as appears in Fig. 14. The grooves 136a may be filled with packing or other substance. Passages 139a and 139b communicate between the chamber e" and inner side of the packing, for the obvious purpose of causing this packing to firmly engage within nipple 121 by the force employed to drive the piston downward. Great force may be exerted upon the piston by the racks and pinions. If, for example, the ratio between the pinions is 2½ to 1, a cable pull upon head 123c of ten thousand pounds will drive the piston downward by twenty-five thousand pounds. If the effective area of the piston is five square inches, five thousand pounds per square inch will be exerted to expand the packer.

In operation, the device is lowered into position upon an empty drill stem, as explained, for the preceding forms. A cable, having upon its lower end an overshot or other tool capable of engaging upon the head 123c, is let down and so engaged. The required pull is exerted upon the cable for the duration of the test. The cable is then released from head 123c. Pressure of well fluid exterior of the packer then pumps the piston back and causes all parts to return to the positions shown; whereupon the test fluid may be bailed out, swabbed out, or recovered by withdrawing the drill stem, as in the other forms. If, as stated for the other forms, the test fluid be withdrawn by bailing or swabbing, successive tests may be made with this device in rapid succession, by merely raising or lowering it and manipulating the cable, as explained. It is understood that all references to positions and directions, such as "upper" and "lower," "upward" and "downward," "above" and "below," apply to the tool as illustrated in the accompanying drawings wherein the upper portion of the tool is shown uppermost.

While I have shown and described the preferred embodiment of my invention it will be understood that the same are illustrated examples only and are not intended to limit minor variations in the construction and apparent uses of the device.

What is claimed is:

1. A well testing tool comprising in combination an outer shell, a packer thereon, fluid pressure means to expand said packer, a drill stem releasably connected to said shell, a pull member fixed to said shell, and means operable from the surface to engage said member to anchor said shell so that subsequent downward movement of said drill pipe will actuate said first means to expand said packer.

2. A well testing tool comprising in combination an outer shell, a packer thereon, fluid pressure means to expand said packer, a drill stem releasably connected to said shell, a pull member fixed to said shell, means operable from the surface to engage said member to anchor said shell so that subsequent downward movement of said drill pipe will actuate said first means to expand said packer, and ports on said shell and stem to communicate after setting of said packer.

3. A well testing tool comprising in combination an outer shell, a packer thereon, fluid pressure means to expand said packer, a drill stem releasably connected to said shell, a pull member fixed to said shell, means operable from the surface to engage said member to anchor said shell so that subsequent downward movement of said drill pipe will actuate said first means to expand said packer, and clutch means between said stem and shell releasable by the downward movement of said pipe to release the pipe from said shell for rotation.

4. A well testing tool comprising in combination an outer shell, a packer thereon, fluid pressure means to expand said packer, a drill stem releasably connected to said shell, a pull member fixed to said shell, means operable from the surface to engage said member to anchor said shell so that subsequent downward movement of said drill pipe will actuate said first means to expand said packer, and latch means between said stem and shell to indicate to the operator that said stem is released to actuate said pressure means to set said packer.

5. A well testing tool comprising in combination an outer shell, a packer thereon, fluid pressure means to expand said packer, a drill stem releasably connected to said shell, a pull member fixed to said shell, means operable from the surface to engage said member to anchor said shell so that subsequent downward movement of said drill pipe will actuate said first means to expand said packer, ports on said shell and stem to be aligned after setting of said packer, and latch means between said stem and shell to indicate to the operator that said stem is released to actuate said pressure means to set said packer.

6. A tool of the character described including a drill pipe, a shell fixed thereto, a packer on said shell, a reservoir in said shell for liquid to expand said packer, a piston assembly movable within said shell independently of the movement of the drill pipe to force liquid from said reservoir into said packer, and means operable within said pipe to move said piston assembly.

7. A tool of the character described including a drill pipe, a shell fixed thereto, a packer on said shell, a reservoir in said shell for liquid to expand said packer, a piston assembly movable within said shell to force liquid from said reservoir into said packer, means operable within said pipe to move said piston assembly, and ports on said assembly and shell communicating by such movement to admit a sample of well fluid after setting of said packer.

8. A tool of the character described including a drill pipe, a shell fixed thereto, a packer on said shell, a reservoir in said shell for liquid to expand said packer, a piston assembly movable within said shell to force liquid from said reservoir into said packer, and means operable within said pipe to move said piston assembly, said means including a removable weight.

9. A tool of the character described including a drill pipe, a shell fixed thereto, a packer on said shell, a reservoir in said shell for liquid to expand said packer, a piston assembly movable within said shell to force liquid from said reservoir into said packer, means operable within said pipe to move said piston assembly, ports on said assembly and shell to be aligned by such movement to admit a sample of well fluid after setting of said packer, and clutch means connecting said pipe and shell, which clutch is operable to release said pipe for independent rotation relative to said shell, said means also being operable by movement of the pipe.

10. A tool of the character described including a drill pipe, a shell fixed thereto, a packer on said shell, a reservoir in said shell for liquid to expand said packer, a piston assembly movable within said shell to force liquid from said reservoir into said packer, and means operable within said pipe to move said piston assembly, said means including a cable.

11. A tool of the character described including a drill pipe, a shell fixed thereto, a packer on said shell, a reservoir in said shell for liquid to expand said packer, a piston assembly movable within said shell to force liquid from said reservoir into said packer, and means operable within said pipe to move said piston assembly, said means including a cable and a rack and pinion device.

12. A combination well testing and cementing device including an operating string of pipe, a shell surrounding a portion of said pipe and adapted to have telescopic movement over it, means upon the lower end of the pipe to lift the shell, an adjustable latch connecting said shell and pipe, said latch being operable by weight of said pipe in combination with the pulling force of a cable, a hydraulic packer mounted on said shell, a piston within the shell, said piston being adapted to be operated by the pipe and the cable, intake ports in said shell normally out of communication with similar ports in said pipe, a pull tube attached to the shell below the intake ports and having a pull bar attached to its upper end adapted to be engaged by a cable means for supporting the weight of the pipe upon the shell, said tube having openings for pump fluid, a cable adapted to be anchored at the top of the well and to be releasably engaged with the pull tube, packing means between the pull tube and the pipe proximately below the intake ports of the pipe, a latch engageable between the pipe and the shell, a clutch means between the shell and the pipe, said clutch being adapted to permit limited telescopic movement between the pipe and the shell after the latch is sprung, said clutch being further adapted to permit rotation of the pipe relative to the shell after a predetermined telescopic movement between said members, said clutch having one guide rib longer than the others acting as a guide to facilitate reengagement of the clutch, a thrust bearing in the pipe below the clutch, a piston upon the pipe, said piston being operable within the shell, a chamber full of fluid under the piston, said fluid being adapted to be forced through openings in the shell and into a packer for the purpose of expanding the packer against the well bore or casing, a flare-fluid chamber filled with a telltale substance adapted to be forced into the well bore or casing above the packer when the packer is expanded, a check valve upon the lower end of the pull tube, said valve being adapted to be opened by pump fluid in the pipe, an instrument case in the shell below the packer, and a drill bit upon the lower end of the shell.

13. An operating string of pipe, a shell surrounding a portion of said pipe and having limited telescopic movement over it, an adjustable latch connecting said pipe and shell, a hydraulic packer mounted on said shell, a piston within the shell, said piston being adapted to be operated by the pipe and a cable, intake ports in said shell normally out of communication with similar ports in said pipe, a pull tube attached to the shell below the intake ports and having a pull bar attached to its upper end adapted to be engaged by a cable means for supporting the weight of the pipe, said tube having openings for pump fluid, a cable adapted to be anchored to the top of the well and to be releasably engaged with the pull tube, packing means between the pull tube and the pipe proximately below the intake ports of the pipe, a clutch between the shell and the pipe, said clutch being adapted to prevent rotation of the pipe and shell relative to each other until the pipe has been moved perpendicularly a predetermined distance relative to the shell after which movement the pipe may be rotated independently of the shell, a thrust bearing in the pipe below the clutch, a piston upon the pipe, said piston being operable within the shell, a chamber full of fluid under the piston, said fluid being adapted to be forced through openings in the shell and into a packer for the purpose of expanding it, and means for withdrawing the device, pipe and sample of well fluid from the well.

14. A combination well testing and cementing device including an operating string of pipe, a shell surrounding the pipe and adapted to have limited telescopic movement therewith, a packer mounted on said shell, a clutch coupling between the pipe and the shell, a tube attached to one member of the clutch and extending downward therefrom and having lateral openings for pump fluid, said tube having means attached to its lower extremity to limit upward movement thereof in order to control engagement of the clutch, intake ports in said tube normally out of communication with similar ports in said shell, the ports of the tube and shell being adapted to become in communication with each other when the piston is forced downward, packing means between the tube and the shell below the intake ports, a piston assembly on said tube slidable within the shell, a chamber filled with fluid under the piston, said fluid being adapted to expand the packer by force of the piston, a removable weight run into the pipe on a cable to disengage the clutch, expand the packer, and open the intake ports, a check valve in the shell below said tube, said check valve being adapted to be opened by pump fluid from above, an instrument case in the shell, and a drill bit upon the lower end of the shell.

15. A combination well testing and cementing device including an operating string of pipe, a shell surrounding the pipe and adapted to have limited telescopic movement therewith, a packer mounted on said shell, a tube attached to one member of the clutch and extending downward therefrom and having lateral openings for the pump fluid, intake ports in said tube normally out of communication with similar ports in said shell, the ports of the tube and shell being adapted to become in communication with each other when the piston is forced downward, a piston on said tube slidable within the shell, a chamber filled with fluid under the piston, said fluid being adapted to expand the packer by force of the piston, and a removable weight to be run into the pipe on a cable to disengage the clutch, expand the packer, and open the intake ports.

16. A well tool including a clutch coupling consisting of a male member and two female members, each of said members having a plurality of keys, said female members being rotatable relative to each other when the clutch is disengaged and being locked together when the clutch is engaged, the keys upon the female members being adapted to be moved into alignment with each other by one key longer than the others upon said male member.

17. A combination well testing and cementing device including an operating string of pipe having within its lower portion a shell containing two racks and a pinion, one rack having an upward extension formed into a head adapted to be engaged by a cable pulling means and having teeth engaged with mating teeth upon a pinion or gear secured within said shell, the other of said racks having teeth engaged with mating teeth upon said gear, the latter teeth being formed upon a portion of smaller diameter than the portion having the teeth engaged with the other rack, the second rack having a downward extension, an intake nipple attached to said extension, said nipple having lateral openings for pump fluid, intake ports in said nipple normally out of communication with similar ports in the shell surrounding the nipple, said ports being adapted to become in communication with each other when the packer is expanded, a piston on said nipple or tube slidable within said shell, a chamber full of fluid under said piston, said fluid being adapted to expand the packer by force of the piston, cable means for releasably engaging the head of said first rack and pulling said head upward so as to force the other rack downward with the piston.

18. In a tool of the character described, the combination of two racks and a connected pinion, a cable to be connected to one of said racks to exert an upward pull thereon whereupon said pinion tends to force the other rack downward, and a packer to be expanded by said last rack.

19. In a device for cementing wells, an operating string of pipe extending through a shell and adapted to lift the shell by means upon the lower end of the pipe, a shell telescopically movable over said pipe and having lateral discharge openings, a packer on said shell, a pull tube attached to said shell, this tube having lateral openings for entrance of liquid cement, discharge openings in the pipe proximate its lower end, said openings being normally out of communication with the discharge openings of the shell and adapted to become in communication therewith when the packer is expanded, and a cable pulling means adapted to engage a head upon the pull tube, whereby the packer may be expanded and the discharge openings of the pipe and shell brought into communication with each other so that cement can be discharged under pump pressure into the well below the packer.

ALEXANDER BOYNTON.